ALARM SYSTEM USING TELEPHONE EXCHANGE AND AUTOMATIC DIALER FOR TRANSMISSION OF TONE FREQUENCIES

Filed Aug. 26, 1963 4 Sheets-Sheet 1

INVENTOR.
WILLIAM F. HOGAN

BY James and Franklin

ATTORNEYS

June 20, 1967 W. F. HOGAN 3,327,060

ALARM SYSTEM USING TELEPHONE EXCHANGE AND AUTOMATIC DIALER FOR TRANSMISSION OF TONE FREQUENCIES

Filed Aug. 26, 1963 4 Sheets-Sheet 2

INVENTOR.
WILLIAM F. HOGAN

BY James and Franklin

ATTORNEYS

June 20, 1967 W. F. HOGAN 3,327,060

ALARM SYSTEM USING TELEPHONE EXCHANGE AND AUTOMATIC DIALER FOR TRANSMISSION OF TONE FREQUENCIES

Filed Aug. 26, 1963 4 Sheets-Sheet 3

INVENTOR.
WILLIAM F. HOGAN

BY James and Franklin

ATTORNEYS

June 20, 1967 W. F. HOGAN 3,327,060

ALARM SYSTEM USING TELEPHONE EXCHANGE AND AUTOMATIC DIALER FOR TRANSMISSION OF TONE FREQUENCIES

Filed Aug. 26, 1963 4 Sheets-Sheet 4

INVENTOR.
WILLIAM F. HOGAN

BY James and Franklin

ATTORNEYS

United States Patent Office 3,327,060
Patented June 20, 1967

3,327,060

ALARM SYSTEM USING TELEPHONE EXCHANGE AND AUTOMATIC DIALER FOR TRANSMISSION OF TONE FREQUENCIES

William F. Hogan, 1700 Brookby Road, Scarsdale, N.Y. 10583

Filed Aug. 26, 1963, Ser. No. 304,370
17 Claims. (Cl. 179—5)

This invention relates to alarm or security systems, and more particularly to such a system which works through the usual dial telephone line already present and normally used for telephone purposes.

The general object of this invention is to provide a means in the home for automatically making an emergency call through the already available telephone system. When an emergency is sensed, a suitable telephone number is dialed by the transmitter, and thereafter a short message is transmitted in a digital code through the dialed telephone connection. At the called station the message is decoded and recorded, by printing, and the call is acknowledged, all automatically. The information also may be displayed on digital readouts. Differently stated, an object of this invention is to automatically dial a call to a protection center, usually a police station or firehouse; to then transmit a short numeric coded alarm message; and to hang up.

In accordance with further objects, appropriate safeguarding measures may be provided. For example, voltage sensing devices may be included to safeguard line continuity.

Another object of the invention is to largely employ design elements already used in standard public telephone offerings, but implemented by control circuits to initiate and terminate calls automatically. In accordance with a further object, no change is needed in the dial switching equipment at the central telephone office.

For descriptive purposes, the design elements which are to be integrated into the present telephone security system are assumed to the Bell Telephone System units on which specifications have been published. However, the system is not limited to Bell System equipment, and equivalent subscribed sets made by any other manufacteurer may be substituted.

Two recent offerings in telephone communications are partially utilized in the present security system. These offerings are a card dial telephone set, and a low-speed parallel data set. The card dialer as heretofore made can only dial, and requires manipulation to do so. The data set as heretofore made also requires manipulation. The present invention uses features of the two sets, but implements them with appropriate controls in such a way that dialing and data transmission take place automatically.

A low-speed parallel data system, newly offered in the Data-Phone field, may be used for transmission of the message. The data transmitter is controlled by the card dialer to send parallel multifrequency signals over the telephone line to a parallel data receiver. At that point the signals are decoded and printed, and/or presented to a readout panel in decimal numeric form.

The card dialer has a card which is punched for the telephone number of a protection center, and which is permanently in position for dialing. When an alarm is initiated the telephone set first bids for a dial tone, and upon receipt of a dial tone dials the number by transmitting dial pulses as read off the punched card. The card dialer then stops and waits for a response.

When a called station responds by sending back an answer tone, the same card and dialer become a machine transmitted which keys the parallel data transmitter in accordance with digital information previously punched in the remaining lines of holes on the card. This is simply an identification number. It is sent in the form of tone signals over the telephone line to a parallel data receiver at the called station.

At the called station the tone signals are decoded back to decimal numbers, and the identification message is printed and/or posted in a digital readout panel. Alarms may be sounded and/or flashed at the called station to announce the emergency. When no further data is received, the called station originates a disconnect signal and automatically goes "on hook." Receipt of the disconnect signal at the calling station causes its telephone set to automatically go "on hook" also. The equipment then is ready for operation of another call cycle, or as an ordinary telephone.

To accomplish the foregoing general objects, and other more specific objects which will hereinafter appear, my invention resides in the dial telephone security system, and the elements thereof, and their relation one to another, as are hereinafter more particularly described in the following specification. The specification is accompanied by drawings in which.

*The transmitter*

At the calling station (FIG. 1), a telephone card dialer set 12 is coupled to a parallel wire data transmission set 14. These are supplemented by control circuits at 16 which program the call, and by a data switch 18 that automatically transfers back and forth between dial mode and data mode.

Much of the mechanism in telephone set 12 is like that in a card dialer that is offered publicly. The card dialer is described in Bell Telephone System brochure 12–61 SP55, and in their instruction card 1/61 E4863, to which reference may be had. Perforations are punched in cards to code desired telephone numbers. Many such cards rest in pockets, and a desired card is manually selected.

Figure 2:
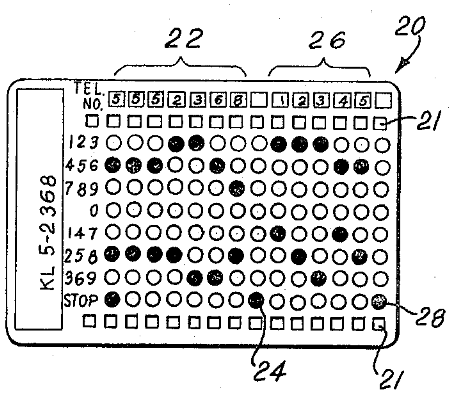
FIG. 2 shows a standard form of dialing card which may be used in the transmitter or calling station.

Such a card is illustrated in FIG. 2. The card 20 is shown in horizontal position, and is more easily perforated and read in that position, but in the usual card dialer is used in vertical position. The holes 21 are sprocket holes for feeding the card upward step by step.

In the standard card dialer, the dial operation is started by manually taking the handset "off hook"; placing a selected card in a slot and pushing it down against a spring to where it latches; listening at the earphone for a dial tone; and then pressing a "start" button which releases the latch of the card dialer mechanism. The card moves upward, and its perforations key a pulser to transmit pulses, as though dialing.

To put this into an automatic system, the manual operations are automated, and the card-reading cycle is extended to include a coded identification message following the dialed number. The card prepared for the emergency call is left permanently in dialing position, concealed and protectively housed within the casing 12 of the equipment. The call initiating sensor may be a manually operated alarm pushbutton, or a transducer which converts an abnormal condition to a trigger pulse. For example fire may cause a thermostat to operate a switch. The sensor may be responsive to flame, or to smoke, instead of temperature. Opening or breaking of a window may affect a burglar alarm circuit. Alarm pushbuttons may be provided at one or more strategic points in a home.

The perforated card has fourteen verticals (in the position shown in FIG. 2). The telephone number ordinarily uses seven of these verticals, marked by bracket 22, and followed by a stop perforation 24. The ninth, tenth, eleventh, etc. verticals are perforated with the transmitting station identification, that is, the code number of the subscriber. This information usually takes only three or four verticals, marked by bracket 26, following which another stop hole 28 is punched to stop transmission. Thus, the card becomes a dual purpose "dial and data" card, with the data portion being sent only after the telephone connection is established. The first stop hole 24 stops the dialer, and effects a transfer to the data transmission mode; and the second stop code hole 28 stops transmission.

Figure 1:
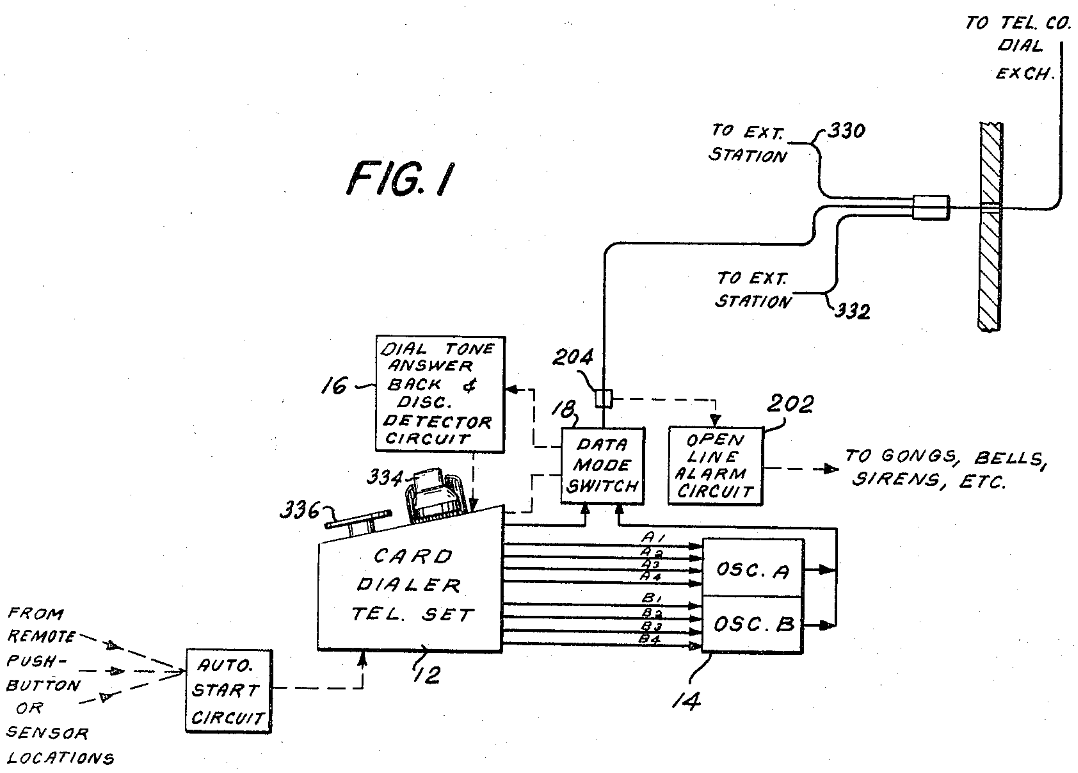
FIG. 1 is a schematic circuit diagram in block form for the transmitter or calling station.

The parallel wire data set, some of which is used here at box 14 in FIG. 1, is described in a publication called "Bell Telephone Laboratories Record," volume 40, No. 3, dated March 1962, in an article entitled "A Low-Speed Data Set for High-Speed Business." This article describes their 401 data transmitting and receiving set, and the operating principles involved.

Heretofore, to set up a data connection, a customer would dial a number just as he would do for a regular telephone call. The receiver may answer the call automatically and send an answer signal or tone to the calling party, indicating that the transmission may be manually initiated. The data transmitter then is fed data by contact closures in any one of a variety of business machines, such as a paper tape reader or a card reader using IBM type cards.

Voice telephone channels pass frequencies from a few hundred to about 3000 c.p.s. (cycles per second). To afford reliability, the above data set uses frequencies from 600 to 2350 c.p.s., which allows guard space at the edges of the band. The "recognition band" for each data frequency is 65 to 80 c.p.s. wide. The system employs a modified FM transmission. The transmitter is powered directly from the telephone line.

The frequencies used in the standard system, ranging from 600 to 2350 c.p.s., are divided into three channels or groups, if used for alpha-numeric transmission. Each channel contains four data frequencies, making twelve in all. In the alpha-numeric system a single character is represented by one frequency from each of the three channels. After each character is transmitted, a rest frequency is provided, different from the four data frequencies. At the end of each character transmission the rest carrier frequency continues for an 80-millisecond delay, which helps eliminate undesirable effects of line echoes.

Each oscillator uses a three-winding ferrite transformer to generate feedback and to control the frequency of oscillation. Tight coupling and large feedback are provided to insure fast oscillator start-up. The lowest frequency in each group is the rest tone generated by a fixed polystyrene capacitor across a portion of the tuning winding of the transformer. The remaining frequencies are obtained by shunting the main tuning winding at appropriate taps by a second inductor.

The holes in punched tape or IBM type cards cause voice frequencies to be generated in the data transmitter. As the column of holes are read in sequence, chords of three coded signal frequencies are transmitted over the telephone channel, each chord representing one character. The term "chord" is not used in a musical sense. Harmonics are avoided. The term means merely the simultaneous use of a plurality of frequencies. The three-out-of-twelve code provides 64 frequency combinations for alpha-numeric work.

The present alarm system is a merely numerical system, and requires only two of the three channels and two of the oscillators described above. With four frequencies in each channel, this two-out-of-eight code provides 16 two-frequency combinations, which is more than needed. There again is a rest frequency in each channel which suppresses echo signals. To provide a rest tone of the desired limited duration a series resistance-capacitance arm is connected across the keying contact terminals that supply power for the oscillators. The transmitter for the numerical system consists of two transistor oscillators A and B (FIG. 1) operated in parallel. Each oscillator can produce the rest frequency and one of four data frequencies, depending on the choice of input lead (A1, A2, etc. and B1, B2, etc. in FIG. 1). In addition to the oscillators A and B, the transmitter may contain a tuned amplifier (at 16 in FIG. 1) that responds to an answer-back tone. It preferably produces closure of either of two relays in response to a respective one of two acknowledgment signals (in addition to dial tone recognition).

Figure 3A:
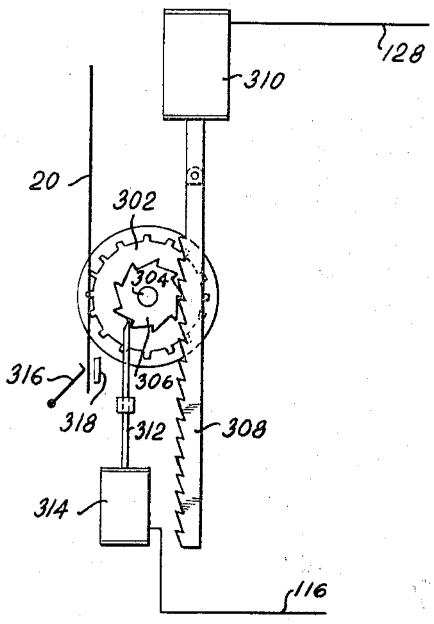
FIG. 3A shows one form of card operating mechanism.
Figure 3:
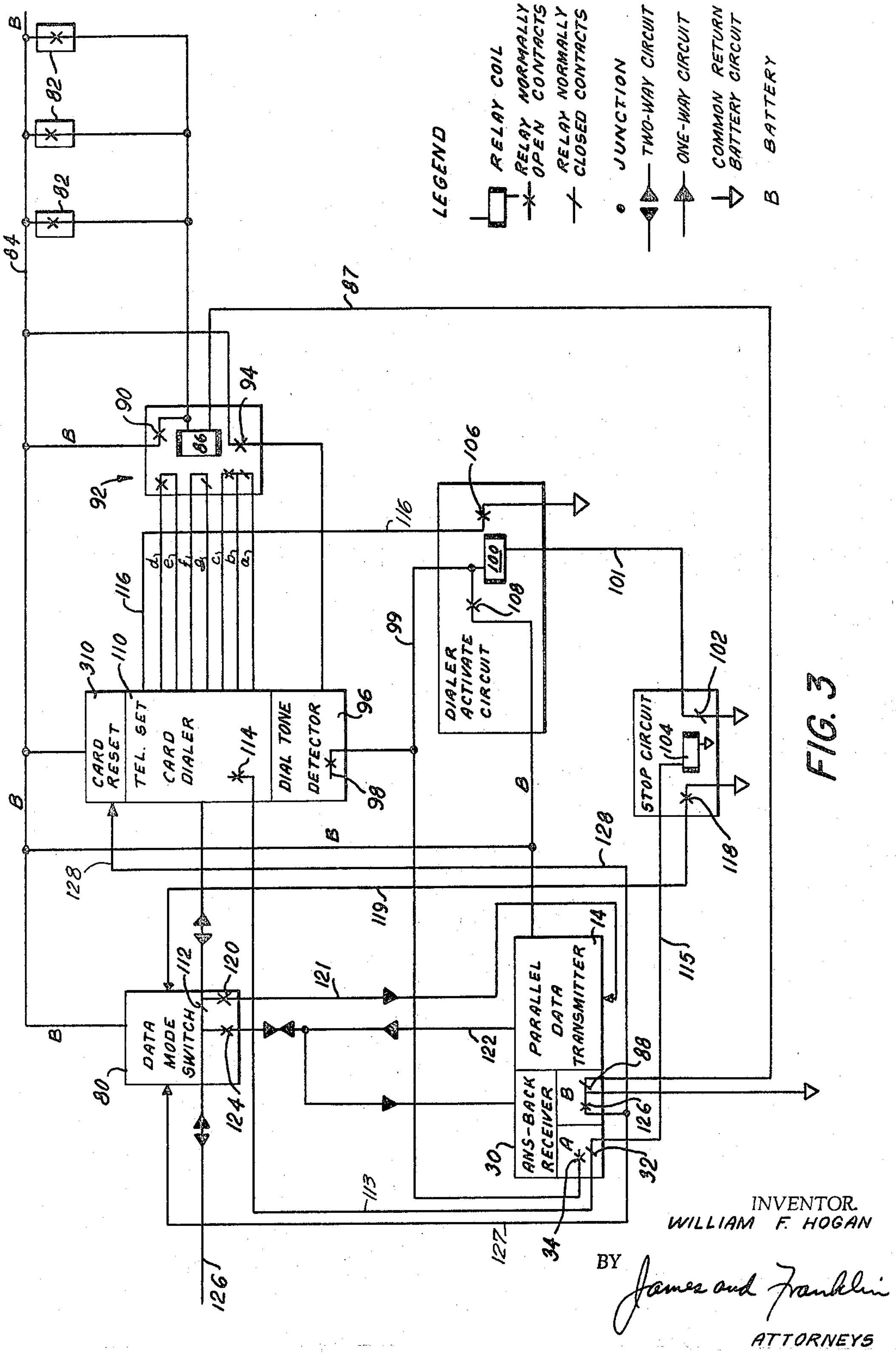
FIG. 3 is a programming diagram for the transmitter.

This two-acknowledgment signalling arrangement is shown at 30 in FIG. 3, in which 32 is a normally closed contact and 34 is a normally open contact. One answer-back signal is interpreted at 30A as a "start data" signal to restart the card dialer for the second half of the card, and the other is interpreted at 30B as a disconnect to restore both stations back to normal "on hook" condition. When data transmission stops, a disconnect signal is generated, and the call terminates with sending and receiving stations restored to the "Stand-By" or "on hook" condition.

Examination of the dial card reproduced in FIG. 2 shows how the coding system falls into the "two-out-of-eight" category. The A channel group of frequencies is assigned to the top group of numbers on the card as follows: Frequency A1 is assigned to the first horizontal line, numbers 1, 2, 3 (horizontal meaning as shown in FIG. 2); frequency A2 is assigned to the second line, numbers 4, 5, 6; frequency A3 is assigned to the third line, numbers 7, 8, 9; and frequency A4 is assigned to the fourth line, number 0. The rest frequency is assigned to the stop function, and is used in combination with the stop frequency (B4) of the B group.

The B channel group is assigned to the bottom group of numbers on the card as follows: frequency B1 is assigned to the first horizontal line numbers 1, 4, 7; frequency B2 is assigned to the second horizontal line numbers 2, 5, 8; frequency B3 is assigned to the third horizontal line numbers 3, 6, 9; and frequency B4 is assigned to the stop function in combination with the rest frequency of group A, as mentioned above. The rest frequency of group B is assigned to the numeral 0 in combination with A4 frequency of group A.

From the above listing, it is apparent that the number 1 as coded on the card will cause frequencies A1 and B1 to be transmitted; number 2 will cause frequencies A1 and B2 to be transmitted; and so on. It is feasible to couple the zero numeral which appears in the top number group only on the card, and which codes the A channel to transmit the A4 frequency, with the rest frequency in the B channel, and thus obtain a frequency combination for zero without a change in the card format. Likewise, "Stop," which appears in the second group only and codes the B channel to transmit the B4 frequency can be coupled with the rest frequency of the A channel, thereby obtaining a frequency combination for "Stop."

There is nothing mandatory about the frequency assignment given above. Should it be found more convenient to modify the dial card to obtain a frequency combination for "zero" and for "stop" by using data frequencies in both groups, much as numbers 1 through 9 are assigned, that would not change the system basically. The rest frequencies are here employed in order to maintain the heretofore used punched card format. By using a different format for the punched card I may employ the data frequencies alone, and not make use of the two rest frequencies except as rest frequencies.

The programming diagram in FIG. 3 shows how the desired sequence of operations is obtained. In the normal "on hook" condition, all relays shown are released (normally closed contacts are closed) and the data mode switch 80 is in the telephone mode (for ordinary telephone use). The fire or burglar or other alarm sensors are shown at 82, and are normally open, but a normally closed sensor may be employed by using a relay to reverse the condition, as is well known.

When any one of the sensors 82 is tripped, it momentarily closes a circuit from battery 84 through "off-hook" or cradle relay coil 86 to conductor 87 and the normally closed contact 88 at 30B answer back receiver and so to ground or battery return. The "off hook" relay 86 operates, and locks through its normally open holding contacts 90, and so remains operated until receipt of an answer-back "B" signal which terminates the call. The "off hook" relay 86 contains a group of four contacts shown on the left below numeral 92. Two are normally open and two are normally closed. They control the seven hook switch leads marked *a* through *g*, in exactly the same manner as a telephone handset does when the cradle is raised by removing the handset. The letters *a* through *g* here correspond to those used in Bell System nomenclature. The sensor 82 and relay 86 thus substitute for manual removal of the handset.

With the "off hook" condition established, the control equipment begins to process the call in the following sequence. The normally open contacts 94 of the off hook relay 86 close and activate a dial tone detector 96, this being essentially a tuned circuit resonant to the dial tone frequency. Upon receipt of a dial tone the dial tone detector 96 closes its normally open contacts 98, which operate a dialer-activate relay 100 via conductors 99 and 101 and normally closed contacts 102 in a stop circuit relay 104. The normally open contacts 106 on the dialer-activate relay 100 close, and cause the card dialer 110 to start via conductor 116. The dialer-activate relay 100 also locks via its own normally open holding contacts 108, and remains operated under control of the stop-circuit relay 104. The card dialer 110 has a pulser and transmits dial pulses, in the usual manner, to the line via normally closed contacts 112 of the data mode switch 80.

No attempt is made here to show the actual dialer and D.C. pulse generating mechanism. However, a simplified mechanism is shown schematically to illustrate the principle, and how the present circuitry ties into the regular dialer mechanism.

Referring to FIG. 3A, the edge of the perforated card is shown at 20. Its marginal sprocket holes engage the teeth of spaced sprocket wheels 302. Their shaft 304 also carries a gear 306 meshing with a rack 308 moved by a solenoid 310. When solenoid 310 operates, it turns the shaft and causes the card 20 to be pulled downward to starting position. This winds a torsion spring, not shown, attached to shaft 304. The sprocket wheel and return spring mechanism may be similar to that used in a standard type card dialer, but in the latter case the card is pushed downward manually to starting position, where it is latched by a manually releasable latch. The downward push winds the spring motor in the standard dialer.

The card 20 is here held in downward position by a lock 312 connected to a solenoid 314. The lock engages automatically, and energization of the solenoid releases the lock and begins the dialing operation. This replaces the manual start bar on the usual dialer. When the "stop" perforation on the card is reached, the solenoid 314 is deenergized and the lock again takes effect until an answer back from the receiving station again energizes solenoid 314 to release the lock for resumed movement of the card.

The part 316 symbolizes a row of contacts, and the part 318 symbolizes a contact plate behind the contacts, for sensing the presence or absence of perforations in the card. This keys a magnet operated pulser, not shown, which sends from one to ten pulses. Instead of the contact plate 318 the usual dialer has slip rings on a shaft which rotates once for ten pulses, at each level or line of perforations. The shaft is turned by a stepping magnet. The number of pulses sent at each level depends on the perforations in the card at that level. The remainder of the rotation of the slip ring shaft is speeded up, with no transmission of pulses, until the card moves up to the next level. If the dialer is so arranged that the start bar operates such a stepping magnet to turn the slip ring shaft off its rest or home position, then solenoid or magnet 314 similarly may close contacts to cause the stepping magnet to begin the turning of the slip ring shaft.

In either case the conductors 116 and 128 leading to the two solenoids 314 and 310 correspond to the similarly numbered conductors 116 and 128 shown in FIG. 3.

Reverting to FIG. 3, when the card dialer reaches the "stop" hole on the card the normally open "stop" contacts 114 on the dialer 110 close, and operate the stop circuit relay 104 via conductors 113 and 115 and normally closed contacts 32 in the 30A answer back circuit. The normally closed contacts 102 of the stop-circuit relay 104 open to release the dialer activate relay 100, which in turn opens the card dial start circuit through conductor 116. In FIG. 3A the solenoid 314 releases lock 312 to stop the card. The stop circuit relay 104 (FIG. 3) changes the data mode switch 80 to data mode, this being done by closing normally open contacts 118 to wire 119. The data mode switch 80 will remain in this position until reversed back to telephone mode by the 30B answer back circuit at the end of the call.

At this point the number has been dialed, the card dialer 110 is at rest, the system is in the data mode, and the control equipment is waiting the first answer-back signal. When the answer-back tone is detected by the answer-back receiver 30A, this opens normally closed contacts 32 which causes the stop circuit relay 104 to release, thereby closing normally closed contacts 102, and thereby again operating the dialer-activate relay 100. The latter relay 100 closes its contacts 106 and locks via its holding contacts 108, as previously described. Contacts 106 through conductor 116 restart the card dialer 110. Parallel signals from the card dialer 110 are now routed to the parallel data transmitter 14 through the data mode switch 80 and its normally open but now closed contacts 120, and wire 121. The output of transmitter 14 (in the form of tone bursts) is fed through conductor 122 and through normally open but now closed contacts 124 of data mode switch 80, and thence to the telephone line circuit 126.

At the conclusion of data transmission when the card dialer 110 reaches the "stop" perforation on the card, the normally open contacts 114 are closed, and through conductors 113 and 115 and contacts 32, cause the stop-circuit relay 104 to operate, which opens the dialer activate relay 100, which in turn opens the card dial start circuit of conductor 116. This causes the card to stop. At this point, the answer-back B signal should be received; and when it is detected by the 30B circuit of the answer-back receiver, the following operations ensue to restore initial conditions.

The normally closed contacts 88 of the 30B circuit open to drop the hook (cradle) relay 86, thus restoring the wires *a* through *g* to "on hook" condition. The normally open contacts 126 of the 30B circuit close, and through wire 127 restore the data mode switch 80 to the telephone mode. Closing of contacts 126 also serves through conductor 128 to operate the card reset solenoid 310 (see also FIG. 3A) to reposition the card to its starting position, where it is latched and remains ready for a subsequent alarm cycle.

The card is shown moved vertically in FIG. 3A, as in a standard card dialer, but for compactness the present concealed permanent card could be moved horizontally, the entire dialer mechanism and the card being turned 90°.

The subscriber may have additional extension telephones, indicated in FIG. 1 by wires 330 and 332. The automatic unit 12 also may have an ordinary handset 334 and dial 336, and these could be wired as an extension telephone. However, because the parts are immediately adjacent, this is not essential, and instead the hand dial may be related to the automatic dialer as is done in the standard card dialer, which also has a hand dial for dialing any number for which there is no card. In the standard card dialer, there is only one cradle switch, whereas here there is a cradle switch for the handset and another (the relay 86 in FIG. 3) which is automatically operated. In such case, some of the connections shown at *a* . . . *g* in FIG. 3 may be changed as follows. The *f* wire is disconnected from the cradle switch and connected in series through the normally closed *f* and *g* contacts of the relay 86, and then back to the *f* connection of the cradle switch. The *d* and *e* wires (or contacts) of the two switches are connected in parallel. The *a* wire of the cradle switch is removed and connected in series through the normally closed *a–b* transfer contacts of relay 86, and then back to the *a* contact of the cradle switch. The *c* contact of the cradle switch is connected to the *c* contact of relay 86. With such an arrangement either cradle switch may go to "off hook," without interference therebetween, assuming that both were previously in the "on hook" condition.

For absolute 24 hour-a-day protection an extra private telephone line may be used for the alarm system. However, a subscriber may feel that the desired protection is needed most at night or while no one is at home, so that the telephone anyway would not be in use, and in such a case a single line may be used for both telephone and alarm purposes.

*The receiver*

Figure 4:
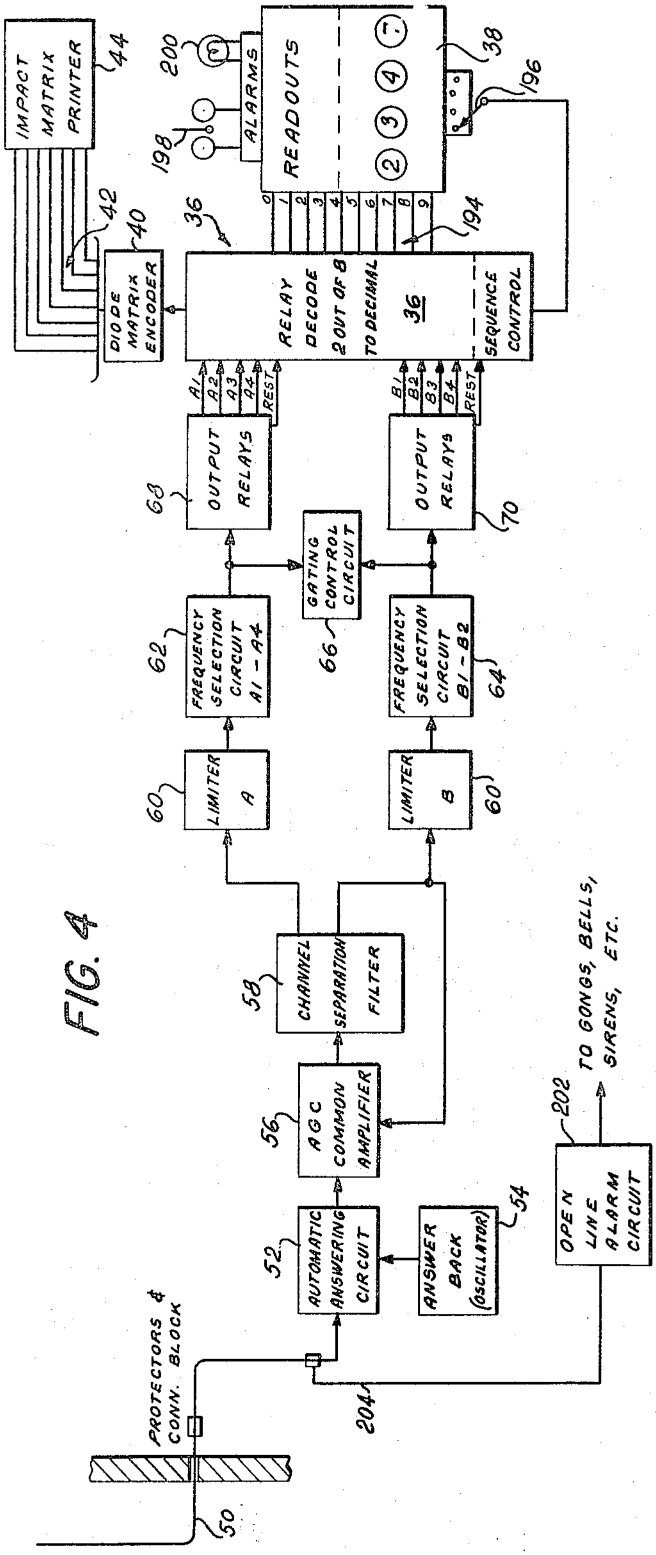
FIG. 4 is a schematic diagram in block form for the receiver at the protection center.

The parallel data receiver is shown in FIG. 4. Usually when a call is received over line 50, answering circuits 52, 54 in the data receiver answer the call and then must transfer the line to the data circuit. However, no such transfer is required here because the equipment remains in the data mode at all times.

The received input data signals in the data set referred to in col. 3 pass through a common amplifier 56. After the signals are amplified, a filter 58 separates the data frequencies by groups, so that each group may drive its respective selection circuit. There are limiters 60, followed by frequency selection filter circuits 62 and 64 for the individual frequencies in groups A and B respectively.

There are five frequencies in each channel, four for data, and one for the rest tone. Usually this fifth frequency is not recognized by the numeric data receiver, and does not produce an output. However, it is utilized in the present system, as mentioned above when describing one particular way to use the perforated card shown in FIG. 2.

Each channel limiter 60 supplies its signal to filters or tuned circuits at 62 and 64. Each of these circuits responds to one of the data frequencies in that channel. When the response of one of the tuned circuits exceeds a fixed threshold voltage the associated detector or rectifier delivers an output to the gating control circuit 66. The gating control circuit then starts timing. If the signal persists for 10 milliseconds, it is recognized as valid. The gating control circuit 66 enables the rectified output to operate the output relays at 68 and 70. It also operates on the detectors to lock in any that are then delivering signals, and desensitizes the others so that they will not respond to trail-edge transients. The gating control circuit 66 remains in this state for 22 milliseconds. At the end of this time the output closures are removed even though the input signals persist. The control circuit 66 is reset only when a simultaneous interruption of both of the two data frequencies exceeds ten milliseconds.

A simple numeric decoding arrangement at 36 fans out the two-out-of-eight codes to appropriate "0" to "9" decimal terminals. A readout panel 38, gated by the rest pulses, makes connection to the decimal terminals, and displays the numbers as an "On-Line" operation. More importantly, the same "0" to "9" terminals are connected to a diode matrix encoder 40, which provides an output at 42 to operate a tape printer 44 which may be of the segmental type disclosed in Patent No. 3,099,711 of Daniel E. Foley and Alfred Skrobish, Patent No. 3,099,711 issued July 30, 1963 and entitled "Printing Device."

Figures 5, 6:
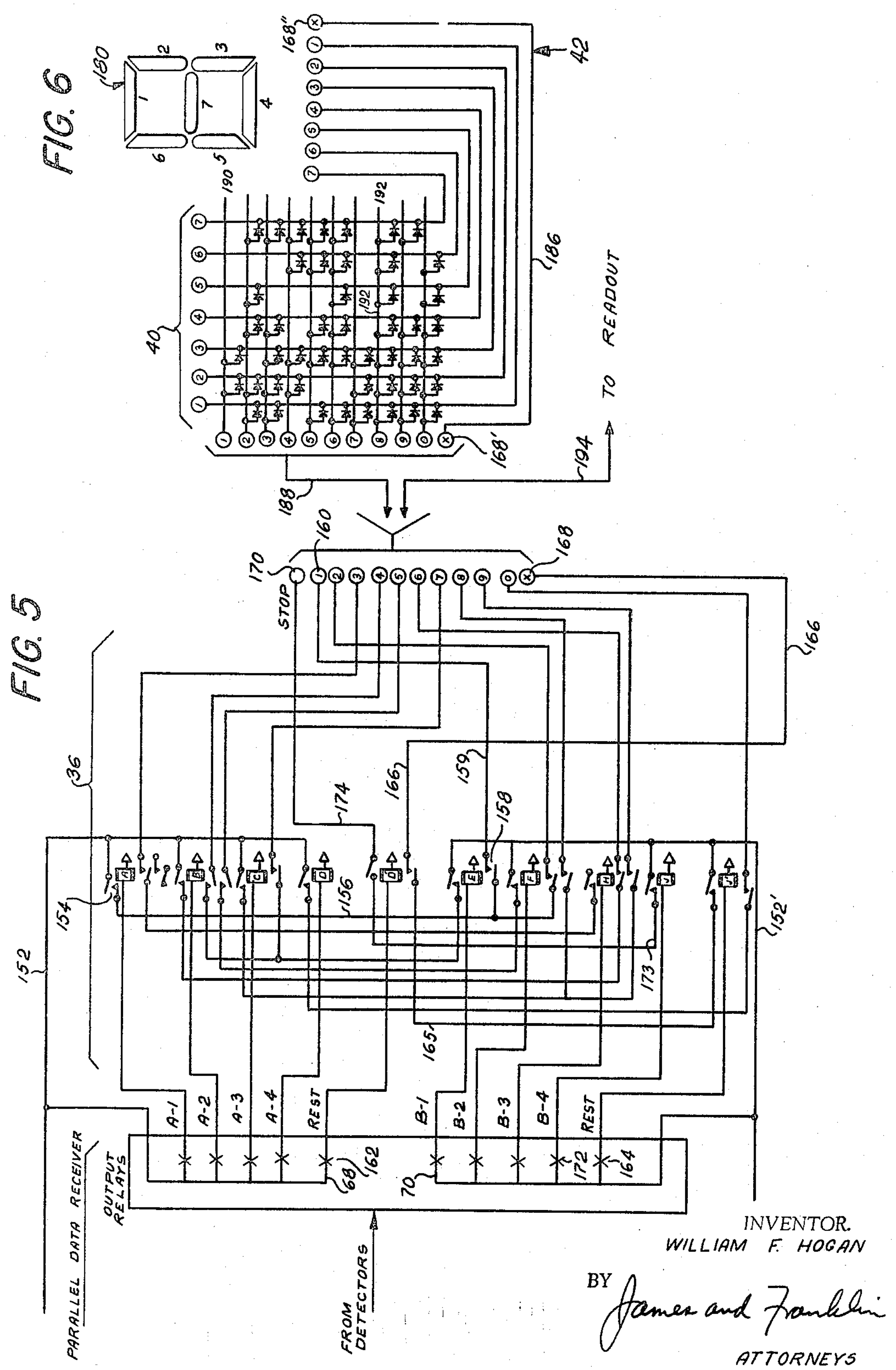
FIG. 5 is a wiring diagram for a part of the receiver, utilizing a printing head, or a visual display, or both.
FIG. 6 shows one arrangement of segments in a segmented printer.

FIG. 5 shows a relay decoder beneath bracket 36 which accepts the above-mentioned relay contact closures in two-out-of-eight code, and converts the signals to contact closures on decimal terminals, and then through a diode matrix shown beneath bracket 40 drives an inpact matrix printer. As pointed out above when describing the dial card, all five frequencies in each channel are used, in order to match the present standard dial card format. The decoder recognizes when rest tones are being received over both channels to advance the posting of numerals to the next numeral readout. Since rest tones are always transmitted over both channels between intelligence tone bursts, this provides a positive sequencing signal. It is used in the impact matrix printer of said Patent 3,099,711 mentioned above, to advance the tape. The printer there shown is asynchronous and will accept signals as timed by the parallel data receiver, without any additional gating.

FIGURE 5 includes details of diode matrix encoder 40 for an impact matrix printer because this printer is new in the printing art. Details of control circuitry for visual displays such as electroluminescent panels, Nixie tubes, etc. are not shown because such devices are known to the art and are readily available. It is feasible to have both display and print-out if desired. The impact matrix printer is especially suited for the present purpose because no control circuitry other than the diode encoder shown in FIG. 5 is required. A power control circuit can be arranged for power turn on when the call is answered, and turn off on the disconnect. The tape advance pulse is obtained from the double rest frequency decode terminal, which is the terminal 168″ marked X. This causes the tape to be advanced one space following each character printed.

The relay decode for the "stop" character appears at terminal 170 of relay decoder 36, and is used by the receiver answer-back circuit to recognize an end-of-message, and to trigger off a disconnect tone signal. Failure to receive the disconnect signal tells the calling station there was trouble on the call. An overall call timing circuit not shown is provided to "time out" after approximately two minutes, and to cause alarms to sound at both stations.

Referring now in greater detail to the relay decoder beneath bracket 36 of FIG. 5, the normally open relay contacts for group A are shown at 68, and those for group B at 70. These are contacts of the relays shown at 68 and 70 in FIG. 4. Assume the digit 1 is being transmitted, thereby closing contacts A1 and B1. This will pull up or close all the contacts of the A and E relays respectively. Power from a common battery or source 152 is then supplied through operated contacts 154 and line 156 to operated contacts 158 and wire 159 to decimal terminal 160, marked "1," as intended. All of the combinations of two out of eight perforations on the dialer card may be traced similarly to show the activation of one or another of decimal terminals "0–9."

In the same fashion, the two rest tones through relay contacts 162 and 164 operate relay contacts at relays D′ and J′, and thereby supply power through conductor 166 to terminal 168 here marked X. This circuit is from bottom battery wire 152′ and top contact of relay J′ through wire 165 to bottom contact of relay D′ and thence through conductor 166 to terminal 168, which terminal is used to gate the output. It causes character advance at the printer and/or readout display.

A stop signal is produced at terminal 170 by a combination of "rest" frequency in group A and the B4 frequency in group B. Thus the closing of the normally open relay contacts 162 and 172 operates relay D′ and relay J, thereby supplying power through conductor 174 to "stop" terminal 170. The circuit is from battery wire 152′, the top contact of the J relay, then wire 173 to the top contact of relay D′, and then wire 174 to terminal 170.

The matrix printer referred to above prints by selectively printing different combinations of seven segments arranged as shown at 180 in FIG. 6. This requires a seven-wire supply, with an eighth wire for step by step advance of the printed tape, these wires being indicated at 42 in FIG. 5. The conversion from the decimal output at the terminals 160 to the eight-wide output shown at 42, is obtained by means of the diode encoder shown beneath bracket 40, and next described in greater detail.

The top or stop terminal 170 does not lead to the diode encoder 184. It is used to request or initiate an answer-back signal from the circuitry shown in FIG. 4. The bottom terminal 168 also does not lead into the diode encoder, except for convenience of cabling, and in effect terminal 168 connects to terminal 168′ which leads through conductor 186 to terminal 168″ to produce tape advance at the printer.

Attention therefore may be confined to the decimal terminals "0–9" which are connected through cable 188 to similar "9–0" terminals in the diode encoder.

Assume numeral "1" has been energized. It supplies current on horizontal wire 190 which through the diodes shown supplies power to vertical lines 2 and 3, and referring to the segments in FIG. 6 it will be seen that vertical segments 2 and 3 provide the desired numeral 1. Assuming power on terminal "8," the power on the horizontal line 192 supplies power through the diodes shown to all of the vertical lines, and this in turn energizes or makes visible all of the segments shown in FIG. 6, thereby producing the desired numeral "8." The other numerals may similarly be traced.

The other cable marked 194 parallels cable 188 and may lead to a visual display panel having readout numerals such as Nixie tubes or other forms of electroluminescent panels for display purposes. The display or readout also may be segmental, as shown in FIG. 6 for the printer, and in such a case the operating supply for the readout may be taken from the eight wires of or parallel to the cable 42, instead of cable 194. The rest frequency terminal 168″ then is used for switching from one readout to the next, instead of for tape advance as is done in the printer.

Reverting to FIG. 4, the printer is shown at 44 with its incoming wires at 42, these corresponding to the wires 42 in FIG. 5. The readout panel is shown at 38 with its sequencing switch at 196 and its incoming wires at 194, which correspond to cable 194 in FIG. 5.

In FIG. 4, a bell alarm is shown at 198, and a lamp alarm is shown at 200. These may be of known type and will be energized whenever power is supplied to the printer 44 and/or the readout panel 38. The alarm circuits ordinarily would have their own lock-up mechanism and would remain operative until intentionally released by an attendant.

*Continuity safeguards*

As a safeguard the telephone lines are monitored continuously for a break in continuity. The monitor controls, which are designated 202 in FIGS. 1 and 4 as "Open Line Alarm Circuits," are voltage sensing devices that sense a loss of central office continuity, and operate an alarm to reveal the failure. Knowledge of lost continuity in a system of this kind is important, for should the line be cut, the protection is nullified.

The line continuity sensors are designed with a high impedance input so as not to impair telephone transmission, nor interfere with telephone signalling apparatus. Their input circuits are slow acting to prevent false triggering, such as might be caused by switching relay operations at the central office, or by momentary opens, line hits, induced pips, etc., occurring on the facilities.

When a line continuity sensor is tripped it will lock up the alarms, which then can be restored by manual means only. The alarms (gongs, lamps, sirens, bells) are powered externally and can be extended to as many locations as desired, including outdoor locations, or special explosion proof types of alarms for use in explosive atomspheres.

It is important that the line continuity sensor be applied at the connecting block as shown at 204 (FIGS. 1 and 4) where the security equipment connects to the channel. At this junction the sensor will be vulnerable to severed main line facilities and/or a severed building pair over which the security arrangement operates.

Figure 7:
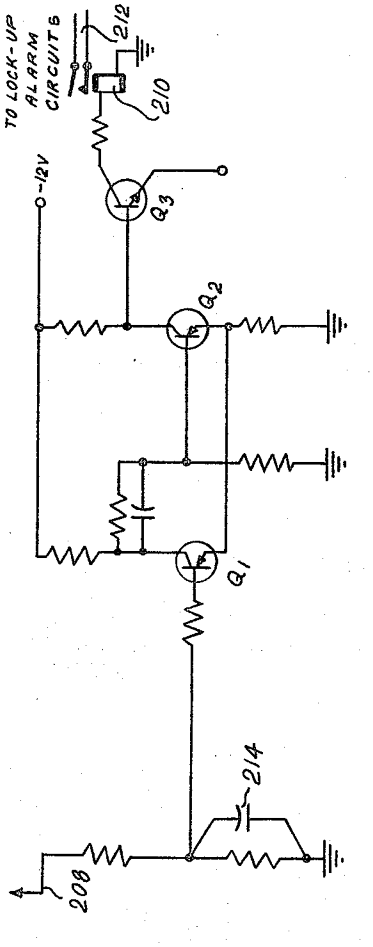
FIG. 7 is a wiring diagram for a safety circuit which may be used in the security system.

To illustrate the voltage sensing safeguard technique reference may be made to FIG. 7 of the drawing. This shows how a Schmitt trigger circuit can be connected to the battery side 208 of the telephone line circuit and thereby recognize either an open line or a grounded line. The illustration assumes the central office battery to be negative. If the central office battery were positive, the Schmitt trigger would use NPN transistors at Q1 and Q2 and a PNP transistor for Q3 rather than PNP's for Q1 and Q2 and NPN for Q3 as shown. Another means of matching the polarity of the central office battery is to equip the input to the Schmitt trigger with a polarity guard circuit. This is a diode bridge full wave rectifier that polarizes the supply to the trigger circuit.

In FIG. 7, transistor Q1 conducts if the input is more negative than minus five volts. The transistor Q2 also conducts if the input is more positive than minus two volts. The transistor Q3 conducts whenever transistor Q2 is conductive.

The loss of battery voltage at 208, or grounding at 208, will cut off transistor Q1, which in turn will cause transistors Q2 and Q3 to conduct. When Q3 conduct it pulls up the contacts of alarm relay 210, which energizes the external alarms through conductors 212.

This happens only if the loss of battery or grounding persists for more than 2½ seconds. The condenser 214 makes the alarm circuit slow acting to prevent false triggering.

*Touch-tone system*

The system can be operated by other transmission devices. For example, the card dialer may be arranged for touch-tone dial signalling. When so arranged the touch-tone card dialer could be used for both dial and data transmissions, thereby eliminating the parallel data transmitter at the calling station. This is possible because touch-tone dialing uses the same transmision technique, i.e., digital signalling through combination frequency tone bursts, in a two-out-of-eight system.

Touch-tone dialing is a new kind of dialing which is now in limited use, but not yet available generally. The dialer has numbered push buttons, and instead of sending a long series of from one to ten pulses, sends out combinations of two tones, there being two groups of four tones available. Thus, the "0–9" digits are sent out by different tones in a two-out-of-eight code. This needs a wholly different kind of central office or exchange which responds to parallel tones instead of a series of pulses.

When such dialing is available, the present system may be greatly simplified because the special parallel data transmitter would not be needed. The dialer would have tone oscillators instead of a pulser. The first part of the card when released would send two-out-of-eight tones to the telephone exchange, and so would provide a desired telephone connection to the protection center (police station etc.). After answer-back, the second part of the card would send out similar two-out-of-eight tones, but this time they are received at the protection center, exactly as described above, and are used to print and/or display the numeric code identification of the endangered subscriber, and to operate an alarm. The card for a touch-tone card dialer could be generally like that described above in FIG. 2 and would require no change in my system as described above.

*Two-card system*

As so far described, the system employs only a single combined dialing and data card. It will be understood, however, that the transmitter may be provided with two such cards and dialers, one card being perforated for the telephone number of the nearest police station, and the other card for the telephone number of the nearest firehouse. The data portion of the cards may be the same for both, assuming that both the police and the fire departments adopt the same identification code for the residences in that area. However, each protection center could use its own code. A fire sensor would release the latch of the fire alarm dialer. A burglary sensor would release the latch of the police alarm dialer. In either case, the completion of the call would restore the used card to initial latched position.

*Other automatic dialers*

Other automatic dialers or repertory dialers have been devised and proposed. The one described above uses perforated cards, but it is also possible to use magnetic cards, perforated tape, magnetic tape, and diode or solid-state memory units, for example using magnetic cores. In all cases, the storage or memory device (e.g., the card or tape) may for convenience be called a "code storage keying unit." This code storage keying unit is designed to take care of a long distance number, and therefore when used for a local number has at least some additioned left-over capacity which may be employed as a keying unit for an identification transmitter, as described above.

*Conclusion*

It is believed that the construction and method of operation, as well as the advantages, of my improved dial telephone security system will be apparent from the foregoing detailed description. It will also be apparent that while I have shown and described the invention in a preferred form, changes may be made without departing from the scope of the invention, as sought to be defined in the following claims. In the claims, the term "danger sensor" is not intended to exclude a pushbutton which is used manually for alarm purposes. The term "card dialer" is not intended to exclude the "touch-tone" system which ordinarily would use numbered pushbuttons instead of a true dial, and which the telephone companies themselves call a "dialer" despite the use of pushbuttons instead of a dial.

I claim:

1. A transmitter for a security system which operates over a telephone line through a telephone exchange, said transmitter comprising a perforated card dialer having a card permanently mounted therein, the first part of the card being perforated to call the telephone number of a receiver at a protection center, and the last part of the card being perforated to transmit the identification of the subscriber, a danger sensor, means operated thereby to start the card dialer, and an audio frequency two-channel parallel data transmitter for numeric transmission using different combinations of different tone frequencies in two-out-of-eight code, said transmitter being keyed by at least the second half of the perforated dial card.

2. A transmitter for a security system which operates over a telephone line through a telephone exchange, said transmitter comprising a perforated card dialer having a card mounted therein, the first part of the card being perforated to call the telephone number of a receiver at a protection center, the last part of the card being perforated to transmit the identification of the subscriber, a danger sensor, means operated thereby to produce "off hook," means responsive to reception of a dial tone to start the card dialer until the number is called, means responsive to an answer-back tone to transfer the transmitter to data mode and to again start the dialer, and a data transmitter arranged for the transmission of different combinations of different tone frequencies, said transmitter being keyed by the second half of the perforated dial card to identify the subscriber.

3. A transmitter for a security system which operates over a telephone line through a telephone exchange, said transmitter comprising a perforated card dialer having a card permanently mounted therein, the first part of the card being perforated to call the telephone number of a receiver at a protection center, followed by a stop perforation, the last part of the card being perforated to transmit the identification of the subscriber, a danger sensor, means operated thereby to produce "off hook," means responsive to reception of a dial tone to start the card dialer until the stop perforation is reached, means responsive to an answer-back tone to transfer the transmitter to data mode and to again start the dialer, a data transmitter for numeric transmission arranged for the transmission of different combinations of different tone frequencies, said transmitter being keyed by the second half of the perforated dial card, and means responsive to a second answer-back tone from the receiver to restore the transmitter to "on hook."

4. A transmitter for a security system which operates over a telephone line through a telephone exchange, said transmitter comprising a perforated card dialer having a card permanently mounted therein, the first part of the card being perforated to call the telephone number of a receiver at a protection center, followed by a stop perforation, the last part of the card being perforated to transmit in two-out-of-eight code the identification of the subscriber, a danger sensor, relay means operated thereby to produce "off hook," means responsive to reception of a dial tone to start the card dialer until the stop perforation is reached, means responsive to an answer-back tone to transfer the transmitter to data mode and to again start the dialer, an audio frequency two-channel parallel data transmitter for numeric transmission using different combinations of different tone frequencies in two-out-of-eight code, said transmitter being keyed by the second half of the perforated dial card, and means responsive to a second answer-back tone from the receiver to restore the transmitter to "on hook."

5. A security system which operates over a telephone line through a telephone exchange, said system comprising a transmitter at the subscriber and a receiver at a protection center, the transmitter comprising a perforated card dialer having a card mounted therein, the first part of the card being perforated to call the telephone number of the receiver at the protection center, and the last part of the same card being perforated to transmit the identification of the subscriber by transmission of different combinations of different tone frequencies, said receiver comprising an automatic answer-back circuit, a decoder, a printer responsive to the receiver output, and an alarm responsive to the receiver output.

6. A security system which operates over a telephone line through a telephone exchange, and system comprising a transmitter at the subscriber and a receiver at a protection center, the transmitter comprising a perforated card dialer having a card mounted therein, the first part of the card being perforated to call the telephone phone number of the receiver at the protection center, and the last part of the same card being perforated to transmit the identification of the subscriber by transmission of different combinations of different tone frequencies, a danger sensor, and means operated thereby to start the card dialer, said receiver comprising an automatic answer-back circuit, a decoder, a printer responsive to the receiver output, and an alarm responsive to the receiver output.

7. A security system which operates over a telephone line through a telephone exchange, said system comprising a transmitter at the subscriber and a receiver at a protection center, the transmitter comprising a perforated card dialer having a card mounted therein, the first part of the card being perforated to call the telephone number of the receiver at the protection center, and the last part of the card being perforated to transmit the identification of the subscriber, a danger sensor, means operated thereby to start the card dialer, and an audio frequency two-channel parallel data transmitter for numeric transmission using different combinations of different tone frequencies by a two-out-of-eight code, said transmitter being keyed by at least the second half of the perforated dial card, said receiver comprising an automatic answer-back circuit, filters and relays to separate the frequencies in each channel, a decoder, a printer responsive to the receiver output, and an alarm responsive to the receiver output.

8. A security system which operates over a telephone line through a telephone exchange, said system comprising a transmitter at the subscriber and a receiver at a protection center, the transmitter comprising a perforated card dialer having a card mounted therein, the first part of the card being perforated to call the telephone number of the receiver at the protection center, the last part of the card being perforated to transmit the identification of the subscriber, a danger sensor, means operated thereby to produce "off hook," means responsive to reception of a dial tone to start the card dialer until the number is called, means responsive to an answer-back tone from the receiver to transfer the transmitter to data mode and to again start the dialer, and a data transmitter arranged for the transmission of different combinations of different tone frequencies, said transmitter being keyed by the second half of the perforated dial card to identify the subscriber, said receiver comprising an automatic answer-back circuit, a decimal decoder to provide a 0–9 or ten-wire output, a diode matrix encoder to convert to an output suitable for a segmental printer, and a segmental printer responsive to said encoder output.

9. A security system which operates over a telephone line through a telephone exchange, said system comprising a transmitter at the subscriber and a receiver at a protection center, the transmitter comprising a perforated card dialer having a card mounted therein, the first part of the card being perforated to call the telephone number of the receiver at the protection center, followed by a "stop" perforation, the last part of the card being perforated to transmit in code the identification of the subscriber, a danger sensor, and relay means operated thereby to produce "off hook," means responsive to reception of a dial tone to start the card dialer until the "stop" perforation is reached, means responsive to an answer-back tone from the receiver to transfer the transmitter to data mode and to again start the dialer, an audio frequency two-channel parallel data transmitter for numeric transmission using different combinations of different tone frequencies in code, said transmitter being keyed by the second half of the perforated dial card, and means responsive to a second answer-back tone from the receiver to restore the transmitter to "on hook," said receiver comprising an automatic answer-back circuit including an automatic answer-back oscillator, a channel separation filter to separate the two channels, filters and relays to separate the frequencies in each channel, a decimal decoder to provide a 0–9 or ten-wire output, an alarm responsive to said output, and a printer responsive to said output.

10. A security system which operates over a telephone line through a telephone exchange, said system comprising a transmitter at the subscriber and a receiver at a protection center, the transmitter comprising a perforated card dialer having a card permanently mounted therein, the first part of the card being perforated to call the telephone number of the receiver at the protection center, followed by a "stop" perforation, the last part of the card being perforated to transmit in two-out-of-eight code the identification of the subscriber, a danger sensor, and relay means operated thereby to produce "off hook," means responsive to reception of a dial tone to start the card dialer until the "stop" perforation is reached, means responsive to an answer-back tone from the receiver to transfer the transmitter to data mode and to again start the dialer, an audio frequency two-channel parallel data transmitter for numeric transmission using different combinations of different tone frequencies in a two-out-of-eight code, said transmitter being keyed by the second half of the perforated dial card, and means responsive to a second answer-back tone from the receiver to restore the transmitter to "on hook," said receiver comprising an automatic answer-back circuit including an automatic answer-back oscillator, a channel separation filter to separate the two channels, filters and relays to separate the frequencies in each channel, a decimal decoder to provide a 0–9 or ten-wire output, a diode matrix decoder to convert this to a seven-wire output suitable for a segmental printer, a segmental printer responsive to said encoder output, and an alarm responsive to either of said outputs.

11. In combination, a perforated card for use in the transmitter of a security systm which operates over a telephone line through a telephone exchange, the first part of said card being perforated like the card of a card dialer for the telephone number of a receiver at a protection center, the second part of said card being perforated to transmit the identification of the endangered subscriber, and an audio frequency two-channel parallel data transmitter for transmission using different combinations of different tone frequencies in two-out-eight code, said transmitter being keyed by at least the second part of the perforated card.

12. A transmitter for a security system which operates over a telephone line through a telephone exchange, said transmitter comprising perforated card handling means for response to perforated card means mounted therein, a first perforated card means perforated to call the telephone number of a receiver at a protection center, the second perforated card means being perforated to transmit the identification of the subscriber, a danger sensor, means operated thereby to produce "off hook," means responsive to reception of a dial tone to start movement of the first perforated card means until the number is called, means responsive to an answer-back tone to transfer the transmitter to data mode and to start movement of the second perforated card means, and a data transmitter arranged for the transmission of different combinations of different tone frequencies, said transmitter being keyed by the second perforated card means to identify the subscriber.

13. A transmitter for a security system which operates over a telephone line through a telephone exchange, said transmitter comprising perforated card handling means for response to perforated card means mounted therein, a first perforated card means being perforated to call the telephone number of a receiver at a protection center followed by a stop perforation, a second perforated card means being perforated to transmit in two-out-of-eight code the identification of the subscriber, a danger sensor, relay means operated thereby to produce "off hook," means responsive to reception of a dial tone to start movement of the first perforated card means until the stop perforation is reached, means responsive to an answer-back tone to transfer the transmitter to data mode and to start movement of the second perforated card means, an audio frequency two-channel parallel data transmitter for numeric transmission using different combinations of different tone frequencies in two-out-of-eight code, said transmitter being keyed by the second perforated card means, and means responsive to a second answer-back tone from the receiver to restore the transmitter to "on hook."

14. A transmitter for a security system which operates over a telephone line and through a telephone exchange in order to reach a receiver at a protection center, said transmitter comprising an automatic or repertory-type of dialer having a two-out-of-eight combinational code storage keying unit which stores the number of digits that would be needed for long distance dialing, the first part of the keying unit being preset to call the local telephone number of the receiver at said protection center, the last part of the keying unit not needed for a local call being preset to transmit in two-out-of-eight combinational code the identification of the subscriber, a danger sensor at the subscriber, means operated by said sensor to produce an "off hook" condition, means responsive to the reception of a dial tone at the transmitter to start the automatic dialer until the number of the protection center has been called, means at the transmitter responsive to an answer-back tone to transfer the transmitter to data mode and to again start the automatic dialer, and a data transmitter arranged for the transmission of different combinations of different tone frequencies in two-out-of-eight combinational code in response to the last part of the keying unit in order to transmit the identification of the subscriber.

15. A transmitter as defined in claim 14 which further comprises means responsive to a second answer-back tone from the receiver to restore the transmitter to an "on hook" condition.

16. A security system comprising a plurality of transmitters each as defined in claim 14, said transmitters being located at different subscribers, and a receiver at the said protection center, said receiver comprising an automatic answer-back circuit, a decoder for decoding into decimal form the received two-out-of-eight combinational code, a printer responsive to the decoded decimal receiver output, and an alarm device also responsive to the receiver output.

17. A transmitter for a security system which operates over a telephone line and through a telephone exchange in order to reach a receiver at a protection center, said transmitter comprising an automatic or repertory-type of dialer including a two-out-of-eight combinational code storage keying means adapted to control the transmission of different combinations of different tone frequencies, said keying means storing the number of digits that would be needed for long distance dialing, the first part of said keying means being preset to call the local telephone number of the receiver at the said protection center, the second part of said keying means being preset to transmit in two-out-of eight combinational code the identification of the subscriber, a danger sensor at the subscriber, means operated by said sensor to produce an "off hook" condition, means responsive to the reception of a dial tone at the transmitter to start movement of the keying means through the first part until the number of the protection center has been called, means at the transmitter responsive to an answer-back tone to transfer the transmitter to data mode and to start renewed movement of the keying means for the transmission of different combinations of different tone frequencies in two-out-of-eight combinational code in response to the last part of said keying means in order to transmit the identification of the subscriber.

References Cited

UNITED STATES PATENTS

| | | | |
|---|---|---|---|
| 3,099,711 | 7/1963 | Foley et al. | 178—30 |
| 3,109,894 | 11/1963 | Humphreys | 179—5 |
| 3,124,650 | 3/1964 | Rostad | 179—5 |

OTHER REFERENCES

Noweck, H. E.: "The Versatility of Touch-Tone Calling." In Bell Laboratories Record, vol. 39, No. 9, September 1961, pp. 312–316.

Pferd, W. and Hershey, H. J.: "The Automatic Card Dialer." In Bell Laboratories Record, vol. 39, No. 10, October 1961, pp. 350–353.

Sokoler, R.: "A Low-Speed Data Set for High-Speed Business." In Bell Laboratories Record, vol 40, No. 3, March 1962, pp. 74–80.

Ham, J. H. and Ritchey, J. F.: "Touch-Tone Card Dialer Set." In Bell Laboratories Record, vol. 41, No. 7, July 1963, pp. 268–273.

JOHN W. CALDWELL, *Acting Primary Examiner.*

DAVID G. REDINBAUGH, *Examiner.*

J. T. STRATMAN, *Assistant Examiner.*